US012671644B2

(12) United States Patent
Han et al.

(10) Patent No.: US 12,671,644 B2
(45) Date of Patent: Jun. 30, 2026

(54) INFORMATION MEASUREMENT METHOD AND APPARATUS

(71) Applicant: ZTE Corporation, Shenzhen (CN)

(72) Inventors: Yufang Han, Shenzhen (CN); Jinghai Yu, Shenzhen (CN); Xiangyang Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 253 days.

(21) Appl. No.: 18/720,778

(22) PCT Filed: Oct. 9, 2022

(86) PCT No.: PCT/CN2022/124210
§ 371 (c)(1),
(2) Date: Jun. 17, 2024

(87) PCT Pub. No.: WO2023/109267
PCT Pub. Date: Jun. 22, 2023

(65) Prior Publication Data
US 2025/0055778 A1 Feb. 13, 2025

(30) Foreign Application Priority Data

Dec. 17, 2021 (CN) .......................... 202111556771.5

(51) Int. Cl.
*H04L 43/0852* (2022.01)
*H04L 47/56* (2022.01)

(52) U.S. Cl.
CPC .......... *H04L 43/0852* (2013.01); *H04L 47/56* (2013.01)

(58) Field of Classification Search
CPC ... H04L 5/0053; H04L 5/0058; H04L 5/0078; H04L 5/0082; H04L 7/00; H04L 43/0858;
(Continued)

(56) References Cited

U.S. PATENT DOCUMENTS 7,668,243 B2 * 2/2010 Ho ..................... H04N 21/4305
370/329
2008/0225896 A1 * 9/2008 Otuska ............. H04N 21/43072
375/E7.025
(Continued)

FOREIGN PATENT DOCUMENTS

CN 102171966 A 8/2011
CN 104113386 A 10/2014
(Continued)

OTHER PUBLICATIONS

Joint Routing and Scheduling for Large-Scale Deterministic IP Networks—2020 (Year: 2020).*
(Continued)

*Primary Examiner* — Nizar N Sivji

(74) *Attorney, Agent, or Firm* — CANTOR COLBURN LLP

(57) ABSTRACT

Provided are an information measurement method and apparatus. The information measurement method includes: receiving, by a second network device, a cycle offset measurement message sent by a first network device adjacent to the second network device at a starting moment of a scheduling cycle, wherein the cycle offset measurement message comprises a field representing a cycle length of the scheduling cycle; and determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device.

20 Claims, 6 Drawing Sheets

Receiving, by a second network device, a cycle offset measurement message sent by a first network device adjacent to the second network device at a starting moment of a scheduling cycle, wherein the cycle offset measurement message comprises a field representing a cycle length of the scheduling cycle — S 202

Determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device — S 204

(58) Field of Classification Search
CPC ... H04L 43/0876; H04L 47/22; H04L 43/087;
H04L 27/2607; H04L 12/1881; H04L
47/27; H04L 43/0894; H04L 47/622;
H04L 43/0852; H04L 47/56; H04L
43/106; H04L 47/10; H04L 41/0873;
H04L 41/0886; H04L 43/067; H04L
43/10; H04L 45/121; H04L 47/283; H04L
45/22; H04L 43/0829; H04L 47/28; H04L
47/2433; H04L 47/11; H04L 67/04; H04L
45/502; H04L 41/0654; H04L 47/225
See application file for complete search history.

(56) References Cited

U.S. PATENT DOCUMENTS

| | | | | |
|---|---|---|---|---|
| 2013/0044739 A1* | 2/2013 | Huang | ............... | H04W 52/0216 |
| | | | | 370/338 |
| 2020/0044974 A1* | 2/2020 | Jiang | .................... | H04L 43/0852 |
| 2022/0224653 A1* | 7/2022 | Chen | ........................ | H04L 47/56 |

FOREIGN PATENT DOCUMENTS

| | | |
|---|---|---|
| CN | 107483136 A | 12/2017 |
| CN | 111294131 A | 6/2020 |
| CN | 111628914 A | 9/2020 |
| JP | 2019176276 A | 10/2019 |
| WO | 2021063191 A1 | 4/2021 |

OTHER PUBLICATIONS

CN_111628914 (Year: 2020).*
International Search Report for corresponding application PCT/
CN2022/124210 filed Sep. 10, 2022; Mail date Jan. 18, 2023.
Huawei, HiSilicon, "Latency Analysis for Uu based V2V transport",
3GPP TSG-RAN WG2 #92, Anaheim, USA, Nov. 16-20, 2015,
R2-156834.
European Search Report for Application No. 22906019.9, dated
Feb. 21, 2025, 7 pages.
Krolikowski, Jonatan, et al. "Joint routing and scheduling for
large-scale deterministic IP networks." Computer Communications
165 (2021): 33-42.
Japanese Office Action; Application No. 2024535963; date of
mailing: Aug. 1, 2025; 8 pages.

* cited by examiner

Fig. 1

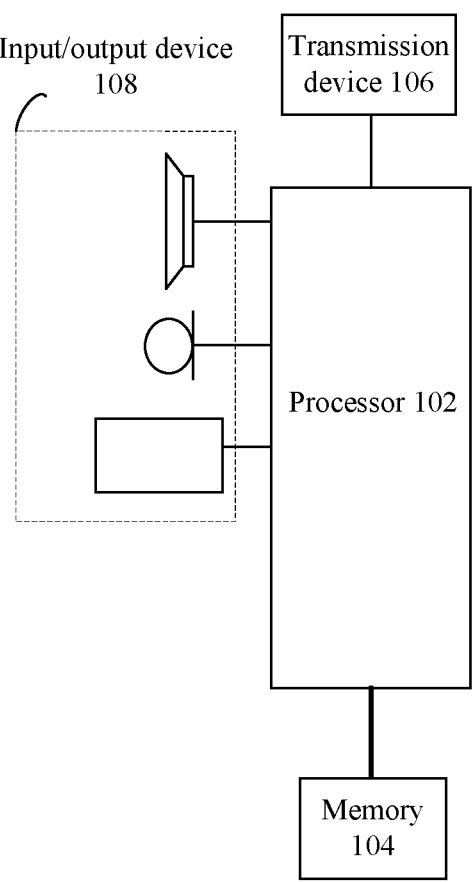

Fig. 2

Receiving, by a second network device, a cycle offset measurement message sent by a first network device adjacent to the second network device at a starting moment of a scheduling cycle, wherein the cycle offset measurement message comprises a field representing a cycle length of the scheduling cycle     S202

Determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device     S204

Fig. 6

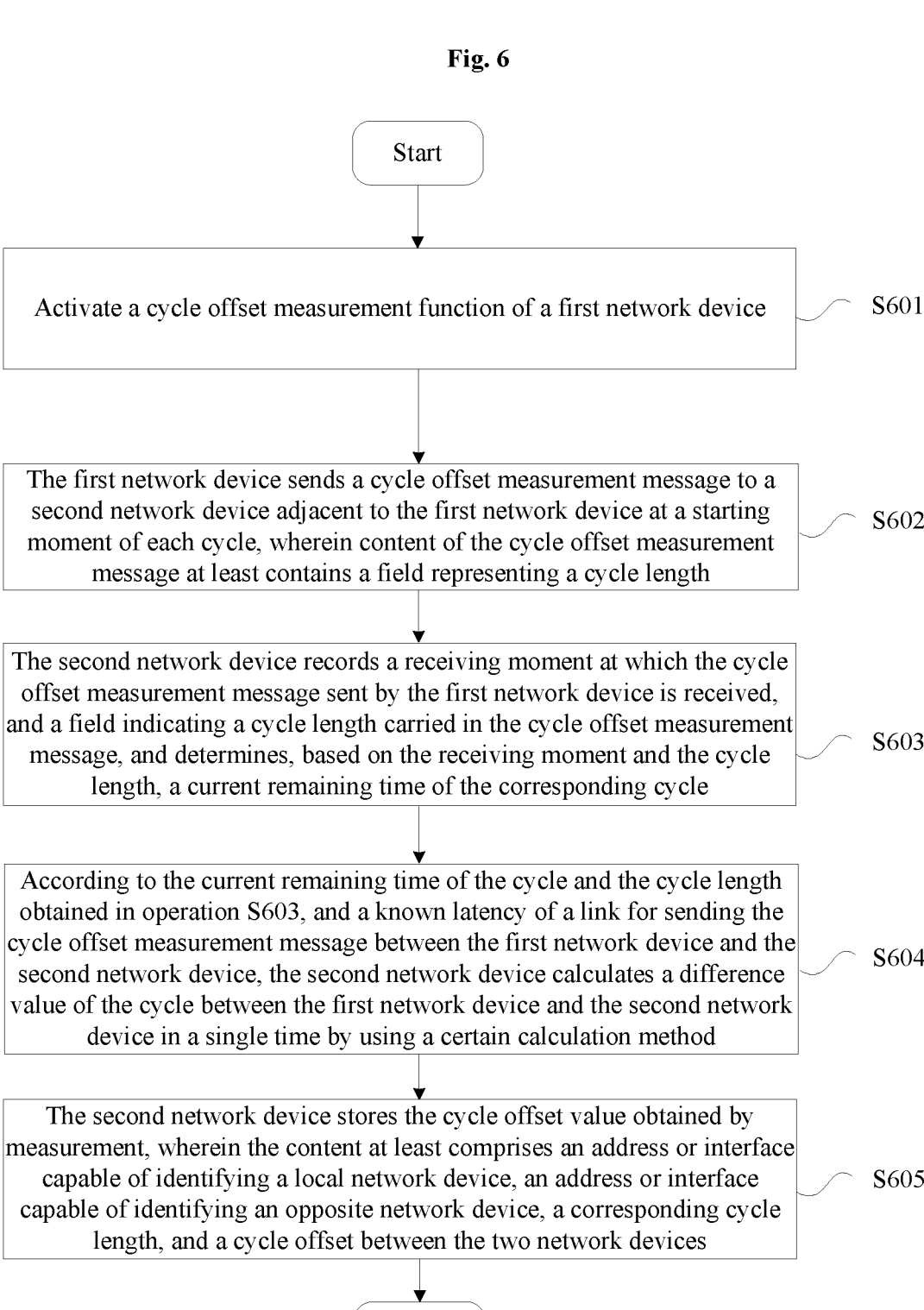

Start

Activate a cycle offset measurement function of a first network device — S601

The first network device sends a cycle offset measurement message to a second network device adjacent to the first network device at a starting moment of each cycle, wherein content of the cycle offset measurement message at least contains a field representing a cycle length — S602

The second network device records a receiving moment at which the cycle offset measurement message sent by the first network device is received, and a field indicating a cycle length carried in the cycle offset measurement message, and determines, based on the receiving moment and the cycle length, a current remaining time of the corresponding cycle — S603

According to the current remaining time of the cycle and the cycle length obtained in operation S603, and a known latency of a link for sending the cycle offset measurement message between the first network device and the second network device, the second network device calculates a difference value of the cycle between the first network device and the second network device in a single time by using a certain calculation method — S604

The second network device stores the cycle offset value obtained by measurement, wherein the content at least comprises an address or interface capable of identifying a local network device, an address or interface capable of identifying an opposite network device, a corresponding cycle length, and a cycle offset between the two network devices — S605

End

Fig. 9

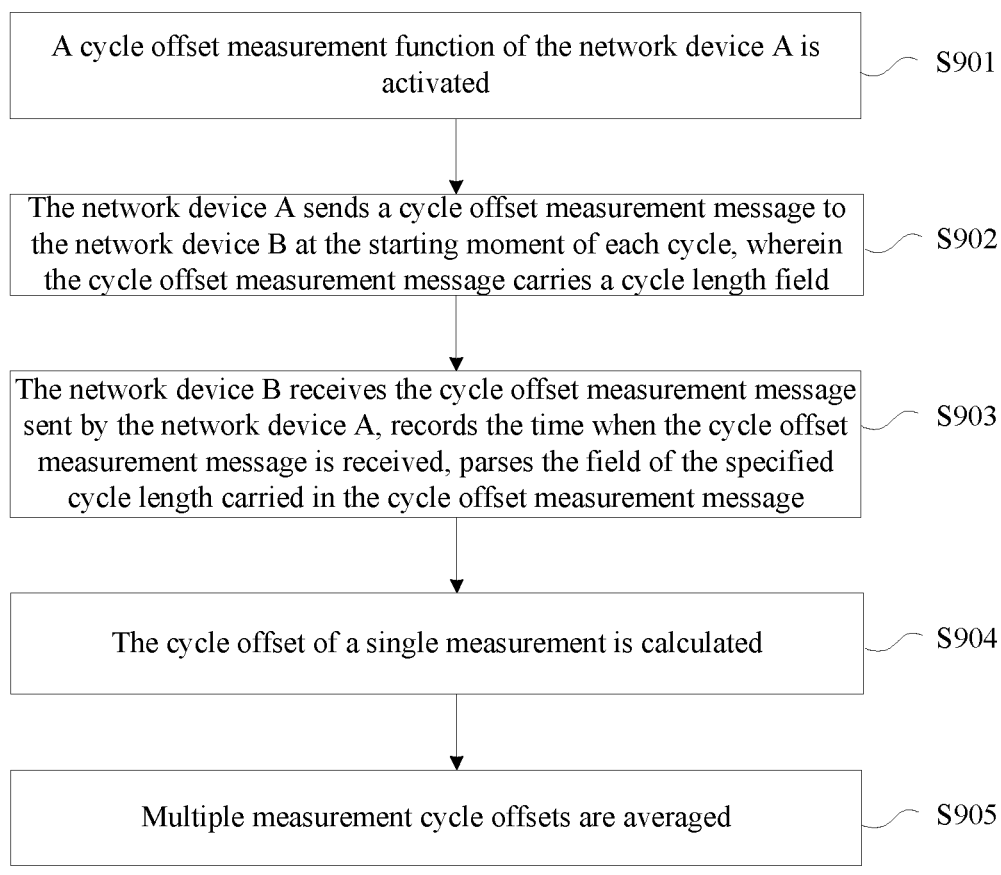

| A cycle offset measurement function of the network device A is activated | S901 |

| The network device A sends a cycle offset measurement message to the network device B at the starting moment of each cycle, wherein the cycle offset measurement message carries a cycle length field | S902 |

| The network device B receives the cycle offset measurement message sent by the network device A, records the time when the cycle offset measurement message is received, parses the field of the specified cycle length carried in the cycle offset measurement message | S903 |

| The cycle offset of a single measurement is calculated | S904 |

| Multiple measurement cycle offsets are averaged | S905 |

Fig. 10

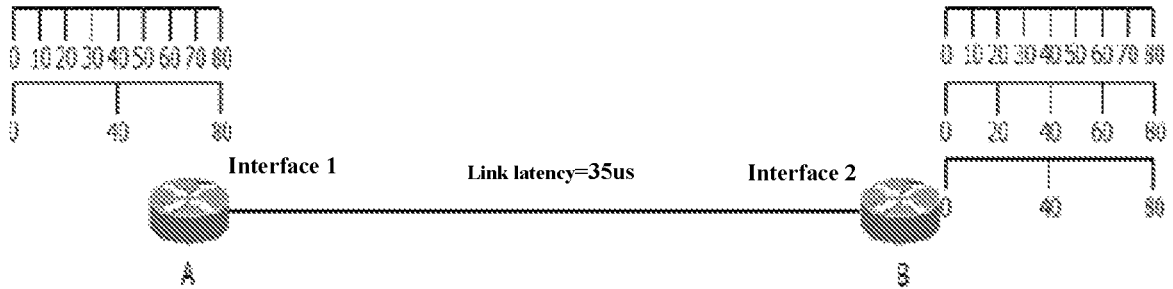

Interface 1     Link latency=35us     Interface 2

Fig. 11

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type（TBD）            |          Length（4）          |
+-+-+-+-+-+-+-+-+-+-+-+-+-+-+-+-+-+-+-+-+-+-+-+-+-+-+-+-+-+-+-+-+
|      Reserved      |                 Cycle（us）                |
+-+-+-+-+-+-+-+-+-+-+-+-+-+-+-+-+-+-+-+-+-+-+-+-+-+-+-+-+-+-+-+-+
```

Cycle measurement sub-TLV

Fig. 12

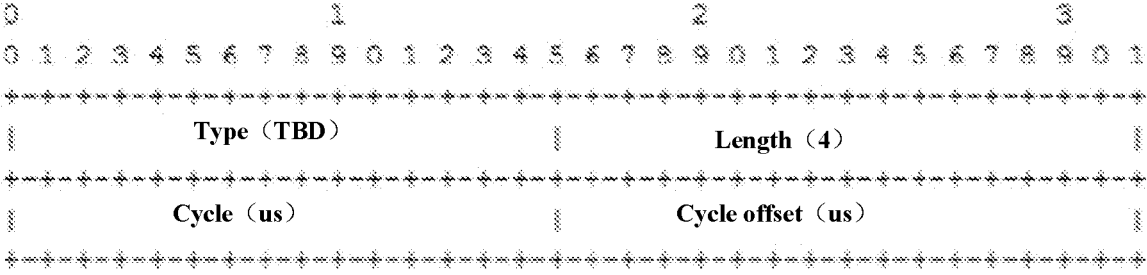

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type（TBD）            |          Length（4）          |
+-+-+-+-+-+-+-+-+-+-+-+-+-+-+-+-+-+-+-+-+-+-+-+-+-+-+-+-+-+-+-+-+
|            Cycle（us）            |        Cycle offset（us）       |
+-+-+-+-+-+-+-+-+-+-+-+-+-+-+-+-+-+-+-+-+-+-+-+-+-+-+-+-+-+-+-+-+
```

Cycle offset sub-TLV

INFORMATION MEASUREMENT METHOD AND APPARATUS

CROSS REFERENCE

This application is a National Stage Filing of the PCT International Application No. PCT/CN2022/124210 filed on Oct. 9, 2022, which claims priority to Chinese Application No. 202111556771.5 filed on Dec. 17, 2021, the entirety of which is herein incorporated by reference.

TECHNICAL FIELD

Embodiments of the present disclosure relate to the field of network communications, and in particular, to an information measurement method and apparatus.

BACKGROUND

In order to meet requirements of low latency and low jitter in the industry, the Time Sensitive Networking (TSN) working group proposed a Cyclic Queuing and Forwarding (CQF) technology, which requires time synchronization among all devices across the time sensitive network. However, achieving high-precision time synchronization across the entire network entails significant costs in practical applications. Therefore, the Deterministic Networking (DetNet) working group proposed Large-scale Deterministic IP Network (LDN) and Cycle Specified Queuing and Forwarding (CSQF) technologies based on the CQF. The LDN and the CSQF do not require time synchronization across the entire network, and only require frequency synchronization. In order to achieve low latency and low jitter deterministic forwarding, deterministic forwarding paths and precise scheduling cycles are required. However, due to the lack of time synchronization, there exist phase differences between different network devices, which inevitably lead to certain cycle offsets caused by misalignment of scheduling cycles between different network devices. In the process of planning paths that satisfy time determinism and conducting precise cycle scheduling, for example, the CSQF scheme based on Segment Routing (SR) uses SR Identifiers (SIDs) to indicate which specified cycle the message needs to be sent out, and uses a SID list to indicate the cycle sequence along which the deterministic service packet needs to be forwarded. In the above scheme, only by considering the cycle offsets between respective hop devices can the forwarding cycle applicable to each hop device be accurately calculated to meet end-to-end latency requirements; if the cycle offsets between respective hop devices are not considered, only paths that roughly meet the latency and jitter requirements can be calculated. The technical solutions in the related art do not address how to obtain this cycle offset.

SUMMARY

The embodiments of the present disclosure provide an information measurement method and apparatus, which may at least solve the problem in the related art that, in order to achieve low latency and low jitter of a service, scheduling cycle offsets between respective network devices need to be determined for calculating a forwarding cycle applicable to each hop device and meeting end-to-end latency requirements.

According to an embodiment of the present disclosure, provided is an information measurement method, including: receiving, by a second network device, a cycle offset measurement message sent by a first network device adjacent to the second network device at a starting moment of a scheduling cycle, wherein the cycle offset measurement message includes a field representing a cycle length of the scheduling cycle; and determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device.

In an exemplary embodiment, before sending, by the first network device, the cycle offset measurement message at the starting moment of the scheduling cycle, the information measurement method further includes: activating a cycle offset measurement function of the first network device for a designated scheduling cycle or a plurality of scheduling cycles, and setting the number of cycle offset measurement messages.

In an exemplary embodiment, the activating a cycle offset measurement function of the first network device for a plurality of scheduling cycles includes: in a case where the first network device has a capability of scheduling in multiple scheduling cycles, activating the cycle offset measurement function for each of the multiple scheduling cycles.

In an exemplary embodiment, the determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device includes: recording, by the second network device, the receiving moment at which the second network device receives the cycle offset measurement message, and determining, by the second network device, remaining time of the scheduling cycle in a current cycle of the second network device according to a difference between the receiving moment and the cycle length of the scheduling cycle; and performing a modulus operation with a sum of the link latency and the remaining time in the current cycle as a dividend and the cycle length of the scheduling cycle as a divisor, so as to obtain the cycle offset of the scheduling cycle between the first network device and the second network device.

In an exemplary embodiment, in a case where there are a plurality of cycle offset measurement messages, the determining, by the second network device, a cycle offset of the scheduling cycle between the first network device and the second network device includes: acquiring a plurality of cycle offsets corresponding to respective cycle offset measurement messages of the plurality of cycle offset measurement messages; and determining an average value of the plurality of cycle offsets as the cycle offset of the scheduling cycle between the first network device and the second network device.

In an exemplary embodiment, after the determining, by the second network device, a cycle offset of the scheduling cycle between the first network device and the second network device, the information measurement method further includes: storing the cycle offset into a cycle offset information advertisement message, and advertising the cycle offset information advertisement message to other nodes or controllers in an entire network; and in a case of supporting scheduling in multiple scheduling cycles, respectively advertising the cycle offset information advertisement message corresponding to each of the multiple scheduling cycles to the other nodes or controllers in the entire network.

In an exemplary embodiment, the cycle offset information advertisement message includes an address or interface of the first network device, an address or interface of the second network device, the cycle length of the scheduling cycle, and the cycle offset.

In an exemplary embodiment, the advertising the cycle offset information advertisement message to other nodes or controllers in an entire network or the advertising the cycle offset information advertisement message corresponding to each of the multiple scheduling cycles to the other nodes or controllers in the entire network includes: for a distributed control model, performing intra-domain or inter-domain advertisement of the cycle offset information advertisement message by expanding an attribute of an Interior Gateway Protocol (IGP) or a Border Gateway Protocol-Link State (BGP-LS); for a centralized control model, acquiring or reporting the cycle offset information advertisement message via a southbound interface between the controllers and network devices.

In an exemplary embodiment, the cycle offset measurement message is a sub-Type Length Value (TLV) newly added in a performance measurement message of Operation Administration and Maintenance (OAM), and an encapsulation format of the cycle offset measurement message includes: a field for indicating that the sub-TLV is of a cycle offset measurement type; a field indicating a length of the sub-TLV; and a field indicating the cycle length of the scheduling cycle.

In an exemplary embodiment, the cycle offset information advertisement message is a sub-Type Length Value (TLV) which is of a link attribute type and is newly added through protocol extension, and an encapsulation format of the cycle offset information advertisement message includes: a field for indicating that the sub-TLV is of a cycle offset attribute type; a field indicating a length of the sub-TLV; a field indicating the cycle length of the scheduling cycle; and a field indicating the cycle offset.

According to another embodiment of the present disclosure, also provided is an information measurement apparatus, which is provided in a second network device and includes: a reception module, configured to receive a cycle offset measurement message sent by a first network device adjacent to the second network device at a starting moment of a scheduling cycle, wherein the cycle offset measurement message includes a field representing a cycle length of the scheduling cycle; and a determination module, configured to determine a cycle offset of the scheduling cycle between the first network device and the second network device according to a receiving moment at which the second network device receives the cycle offset measurement message, the cycle length of the scheduling cycle, and a link latency between the first network device and the second network device.

In an exemplary embodiment, the information measurement apparatus further includes: a storage module, configured to store the cycle offset into a cycle offset information advertisement message, and advertise the cycle offset information advertisement message to other nodes or controllers in an entire network; and in a case of supporting scheduling in multiple scheduling cycles, respectively advertise the cycle offset information advertisement message corresponding to each of the multiple scheduling cycles to the other nodes or controllers in the entire network.

According to another embodiment of the present disclosure, also provided is an information measurement apparatus, which is provided in a first network device and includes: a sending module, configured to send a cycle offset measurement message to a second network device adjacent to the first network device at a starting moment of a scheduling cycle, wherein the cycle offset measurement message includes a field representing a cycle length of the scheduling cycle, so that the second network device determines a cycle offset of the scheduling cycle between the first network device and the second network device according to a receiving moment at which the second network device receives the cycle offset measurement message, the cycle length of the scheduling cycle, and a link latency between the first network device and the second network device.

In an exemplary embodiment, the information measurement apparatus further includes: an activation module, configured to activate a cycle offset measurement function for a designated scheduling cycle or a plurality of scheduling cycles; and a setting module, configured to set the number of cycle offset measurement messages.

According to yet another embodiment of the present disclosure, also provided is a computer-readable storage medium. The computer-readable storage medium stores a computer program, wherein the computer program, when being executed by a processor, causes the processor to execute operations in any one of the method embodiments.

According to yet another embodiment of the present disclosure, also provided is an electronic device, including a memory and a processor, wherein the memory stores a computer program, and the processor is configured to run the computer program so as to execute the operations in any one of the method embodiments.

BRIEF DESCRIPTION OF THE DRAWINGS

FIG. 1 is a block diagram showing the hardware structure of a computer terminal for running an information measurement method according to the embodiments of the present disclosure;

FIG. 2 is a flowchart of an information measurement method according to the embodiments of the present disclosure;

FIG. 6 is a flowchart of a method for measuring a cycle offset between network devices according to the embodiments of the present disclosure:

FIG. 9 is a flowchart of a method for measuring a cycle offset between different devices according to the embodiments of the present disclosure:

FIG. 10 is a schematic diagram of measurement of a cycle offset between different devices A and B according to the embodiments of the present disclosure:

FIG. 11 is a schematic diagram of an encapsulation structure of a cycle offset measurement message according to the embodiments of the present disclosure; and FIG. 12 is a schematic diagram of an encapsulation structure of a cycle offset information advertisement message according to the embodiments of the present disclosure.

DETAILED DESCRIPTION

Figure 3:
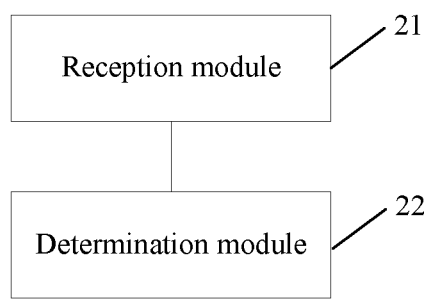
FIG. 3 is a structural block diagram of an information measurement apparatus according to an embodiment of the present disclosure.

Hereinafter, the embodiments of the present disclosure will be described in detail with reference to the accompanying drawings and in conjunction with the embodiments.

It should be noted that, terms such as "first" and "second" in the description, claims, and the accompanying drawings of the present disclosure are used to distinguish similar objects, but are not necessarily used to describe a specific sequence or order.

The method embodiments provided in the embodiments of the present disclosure may be executed in a mobile terminal, a computer terminal, or a similar computing apparatus. Taking running on a computer terminal as an example, FIG. 1 is a block diagram showing the hardware structure of a computer terminal for running an information measurement method according to the embodiments of the present disclosure. As shown in FIG. 1, the computer terminal may include one or more (only one is shown in FIG. 1) processors 102 (the one or more processors 102 may include, but are not limited to, processing apparatuses such as a Micro Controller Unit (MCU) or a Field Programmable Gate Array (FPGA)) and a memory 104 for storing data, wherein the computer terminal may further include a transmission device 106 for a communication function and an input/output device 108. A person having ordinary skill in the art may understand that the structure shown in FIG. 1 is merely exemplary, which does not limit the structure of the foregoing computer terminal. For example, the computer terminal may further include more or fewer components than shown in FIG. 1, or have a different configuration from that shown in FIG. 1.

The memory 104 may be configured to store a computer program, for example, a software program and a module of application software, such as a computer program corresponding to the information measurement method in the embodiments of the present disclosure. The one or more processors 102 may run the computer program stored in the memory 104, so as to execute various function applications and data processing, that is, to implement the foregoing method. The memory 104 may include high-speed random access memory, and may also include non-volatile memory, such as one or more magnetic storage apparatuses, flash memory, or other non-volatile solid-state memory. In some examples, the memory 104 may further include a memory remotely located with respect to the one or more processors 102, which may be connected to a computer terminal over a network. Examples of such network include, but are not limited to, the internet, an intranet, a local area network, a mobile communication network, and combinations thereof.

The transmission device 106 is configured to receive or transmit data via a network. Specific examples of the described network may include a wireless network provided by a communication provider of the computer terminal. In an example, the transmission device 106 may include a Network Interface Controller (NIC) that may be coupled to other network devices via a base station to communicate with the Internet. In an example, the transmission device 106 may be a Radio Frequency (RF) module for communicating wirelessly with the Internet.

FIG. 2 is a flowchart of an information measurement method according to the embodiments of the present disclosure. As shown in FIG. 2, the information measurement method includes the following operations S202 to S204.

In operation S202, a second network device receives a cycle offset measurement message sent by a first network device adjacent to the second network device at a starting moment of a scheduling cycle, wherein the cycle offset measurement message includes a field representing a cycle length of the scheduling cycle.

In operation S204, the second network device determines a cycle offset of the scheduling cycle between the first network device and the second network device according to a receiving moment at which the second network device receives the cycle offset measurement message, the cycle length of the scheduling cycle, and a link latency between the first network device and the second network device. In the embodiments, the receiving moment refers to an amount of time that the scheduling cycle has been running, when the second network device receives the cycle offset measurement message, in a current cycle of the second network device.

In operation S202 of this embodiment, before the first network device sends the cycle offset measurement message at the starting moment of the scheduling cycle, the information measurement method may further include: a cycle offset measurement function of the first network device is activated for a designated scheduling cycle or a plurality of scheduling cycles, and the number of cycle offset measurement messages is set.

In an exemplary embodiment, the operation that the cycle offset measurement function of the first network device is activated for the plurality of scheduling cycles may further include: in a case where the first network device has a capability of scheduling in multiple scheduling cycles, the cycle offset measurement function is activated for each of the multiple scheduling cycles.

In operation S204 of this embodiment, the information measurement method may further include: the second network device records the receiving moment at which the second network device receives the cycle offset measurement message, and determines remaining time of the scheduling cycle in a current cycle of the second network device according to a difference between the receiving moment and the cycle length of the scheduling cycle; and a modulus operation is performed with a sum of the link latency and the remaining time in the current cycle as a dividend and the cycle length of the scheduling cycle as a divisor, so as to obtain the cycle offset of the scheduling cycle between the first network device and the second network device.

In an exemplary embodiment, in a case where there are a plurality of cycle offset measurement messages, the operation of determining the cycle offset of the scheduling cycle between the first network device and the second network device includes: a plurality of cycle offsets corresponding to respective cycle offset measurement messages of the plurality of cycle offset measurement messages are acquired; and an average value of the plurality of cycle offsets is determined as the cycle offset of the scheduling cycle between the first network device and the second network device.

After operation S204 in this embodiment, the information measurement method further includes: the cycle offset is stored into a cycle offset information advertisement message, and the cycle offset information advertisement message is advertised to other nodes or controllers in an entire network; and in a case of supporting scheduling in multiple scheduling cycles, the cycle offset information advertisement message corresponding to each of the multiple scheduling cycles is respectively advertised to the other nodes or controllers in the entire network.

In an exemplary embodiment, the cycle offset information advertisement message includes an address or interface of the first network device, an address or interface of the second network device, the cycle length of the scheduling cycle, and the cycle offset.

In an exemplary embodiment, the operation that the cycle offset information advertisement message is advertised to the other nodes or controllers in the entire network or the cycle offset information advertisement message corresponding to each of the multiple scheduling cycles is advertised to the other nodes or controllers in the entire network may further include: for a distributed control model, intra-domain or inter-domain advertisement of the cycle offset information advertisement message is performed by expanding an attribute of an Interior Gateway Protocol (IGP) or a Border Gateway Protocol-Link State (BGP-LS); for a centralized control model, the cycle offset information advertisement message is acquired or reported via a southbound interface between the controllers and network devices.

In an exemplary embodiment, in the information measurement method, the cycle offset measurement message is a sub-Type Length Value (TLV) newly added in a performance measurement message of Operation Administration and Maintenance (OAM), and an encapsulation format of the cycle offset measurement message includes: a field for indicating that the sub-TLV is of a cycle offset measurement type; a field indicating a length of the sub-TLV; and a field indicating the cycle length of the scheduling cycle.

In an exemplary embodiment, in the information measurement method, the cycle offset information advertisement message is a sub-Type Length Value (TLV) which is of a link attribute type and is newly added through protocol extension, and an encapsulation format of the cycle offset information advertisement message includes: a field for indicating that the sub-TLV is of a cycle offset attribute type; a field indicating a length of the sub-TLV; a field indicating the cycle length of the scheduling cycle; and a field indicating the cycle offset.

By means of the described operations, a second network device receives a cycle offset measurement message sent by a first network device adjacent to the second network device at a starting moment of a scheduling cycle, determines a cycle offset of the scheduling cycle between the first network device and the second network device according to the cycle offset measurement message and a link latency between the first network device and the second network device, and further obtains a forwarding cycle applicable to each hop device conforming to end-to-end latency requirements. Therefore, the problem in the related art that, in order to achieve low latency and low jitter of a service, scheduling cycle offsets between respective network devices need to be determined for calculating a forwarding cycle applicable to each hop device and meeting end-to-end latency requirements may be addressed, thereby achieving the effect of ensuring the accuracy of the scheduling cycle.

Through the description of the foregoing embodiments, a person having ordinary skill in the art may clearly understand that the information measurement method according to the foregoing embodiments may be implemented by software in addition to a necessary universal hardware platform, and definitely may also be implemented by hardware. However, in many cases, the former is a preferred implementation. Based on such understanding, the essence of the technical solutions of the embodiments of the present disclosure or the part contributing to the conventional art may be embodied in the form of a software product, the computer software product is stored in a storage medium (such as Read-Only Memory/Random Access Memory (ROM/RAM)), the magnetic disk, and the optical disk include several instructions for instructing a terminal device (which may be a mobile phone or a computer, a server, a network device, or the like) performs the information measurement methods described in the embodiments of the present disclosure.

The embodiments further provide a device for measuring a scheduling cycle offset between network devices. The information measurement apparatus is used for implementing the described embodiments and exemplary implementations, and what has been described will not be elaborated. The term "module", as used hereinafter, is a combination of software and/or hardware capable of realizing a predetermined function. Although the information measurement apparatus described in the following embodiments is preferably implemented by software, implementation of hardware or a combination of software and hardware is also possible and conceived.

The embodiments of the present disclosure provide an information measurement apparatus, which is provided in a second network device in any one of the information measurement method embodiments. FIG. 3 is a structural block diagram of an information measurement apparatus according to an embodiment of the present disclosure. As shown in FIG. 3, the information measurement apparatus includes: a reception module 21 and a determination module 22.

The reception module 21 is configured to receive a cycle offset measurement message sent by a first network device adjacent to the second network device at a starting moment of a scheduling cycle, wherein the cycle offset measurement message includes a field representing a cycle length of the scheduling cycle.

The determination module 22 is configured to determine a cycle offset of the scheduling cycle between the first network device and the second network device according to a receiving moment at which the second network device receives the cycle offset measurement message, the cycle length of the scheduling cycle, and a link latency between the first network device and the second network device. In the embodiments, the receiving moment refers to an amount of time that the scheduling cycle has been running, when the second network device receives the cycle offset measurement message, in a current cycle of the second network device.

Figure 4:
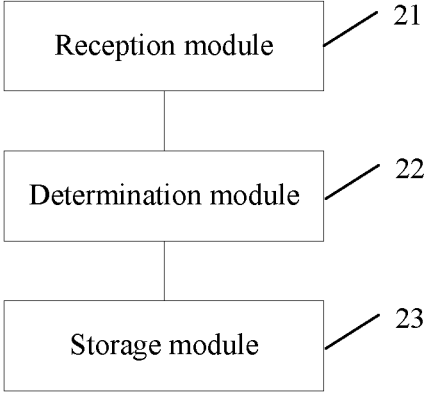
FIG. 4 is a structural block diagram of an information measurement apparatus according to another embodiment of the present disclosure.

FIG. 4 is a structural block diagram of an information measurement apparatus according to another embodiment of the present disclosure. As shown in FIG. 4, the information measurement apparatus further includes a storage module 23 in addition to all the modules shown in FIG. 3.

The storage module 23 is configured to store the cycle offset into a cycle offset information advertisement message, and advertise the cycle offset information advertisement message to other nodes or controllers in an entire network; and in a case of supporting scheduling in multiple scheduling cycles, respectively advertise the cycle offset information advertisement message corresponding to each of the multiple scheduling cycles to the other nodes or controllers in the entire network.

Figure 5:
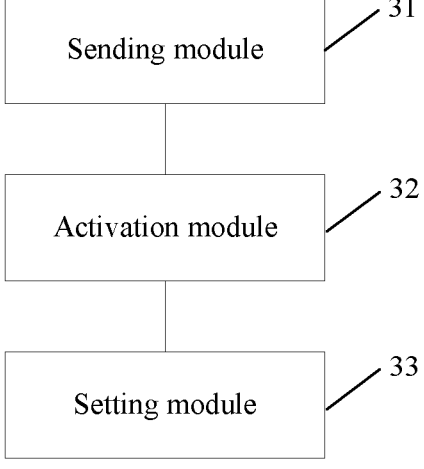
FIG. 5 is a structural block diagram of an information measurement apparatus according to still another embodiment of the present disclosure.

The embodiments of the present disclosure provide an information measurement apparatus, which is provided in a first network device in any one of the information measurement method embodiments. FIG. 5 is a structural block diagram of an information measurement apparatus according to still another embodiment of the present disclosure. As shown in FIG. 5, the information measurement apparatus includes: a sending module 31, an activation module 32 and a setting module 33.

The sending module 31 is configured to send a cycle offset measurement message to a second network device adjacent to the first network device at a starting moment of a scheduling cycle, wherein the cycle offset measurement message includes a field representing a cycle length of the scheduling cycle, so that the second network device determines a cycle offset of the scheduling cycle between the first network device and the second network device according to a receiving moment at which the second network device receives the cycle offset measurement message, the cycle length of the scheduling cycle, and a link latency between the first network device and the second network device.

The activation module 32 is configured to activate a cycle offset measurement function for a designated scheduling cycle or a plurality of scheduling cycles.

The setting module 33 is configured to set the number of cycle offset measurement messages.

It should be noted that each module may be implemented by software or hardware. The latter may be implemented in the following manner, but is not limited thereto. All the modules are located in a same processor; alternatively, the modules are located in different processors in an arbitrary combination.

To facilitate understanding of the technical solutions provided in the embodiments of the present disclosure, the following describes the technical solutions in detail with reference to the embodiments of specific scenarios.

For a network device with a cycle scheduling function, the embodiments of the present disclosure provide a method for measuring a cycle offset between network devices. FIG. 6 is a flowchart of a method for measuring a cycle offset between network devices according to the embodiments of the present disclosure. The network device sends a measurement message corresponding to each cycle to its adjacent network device at the starting moment of the cycle, and the adjacent network device records the time of receiving the cycle offset measurement message, and calculates the cycle offset between the two adjacent devices by using a certain method.

As shown in FIG. 6, the described method for measuring the cycle offset includes the following operations S601 to S605.

In operation S601, a cycle offset measurement function of a first network device is activated.

In operation S602, the first network device sends a cycle offset measurement message to a second network device adjacent to the first network device at a starting moment of each cycle, wherein content of the cycle offset measurement message at least contains a field representing a cycle length.

In operation S603, the second network device records a receiving moment at which the cycle offset measurement message sent by the first network device is received, and a field indicating a cycle length carried in the cycle offset measurement message, and determines, based on the receiving moment and the cycle length, a current remaining time of the corresponding cycle, i.e., a time from the receiving moment at which the cycle offset measurement message is received to the starting moment of a next cycle.

In operation S604, according to the current remaining time of the cycle and the cycle length obtained in operation S603, and a known latency of a link for sending the cycle offset measurement message between the first network device and the second network device, the second network device calculates a difference value of the cycle between the first network device and the second network device in a single time by using a certain calculation method.

In operation S605, the second network device stores the cycle offset value obtained by measurement, wherein the content at least includes an address or interface capable of identifying a local network device, an address or interface capable of identifying an opposite network device, a corresponding cycle length, and a cycle offset between the two network devices.

In operation S601 of this embodiment, the activation of the cycle offset measurement function may be global activation, which means that if the device has a multi-cycle scheduling capability (i.e., a capability of scheduling in multiple scheduling cycles), the cycle offset measurement function of each corresponding cycle is activated; or the activation of the cycle offset measurement function may be activation of the measurement function for a specified cycle. Further, the number of measurement messages may also be set, which means that the cycle offset measurement message is sent at the starting moment of each cycle, and is sent in a plurality of cycles.

In operation S603 of this embodiment, the second network device receives the cycle offset measurement message, acquires the cycle length field carried in the cycle offset measurement message, and if the second network device finds that the second network device does not support scheduling of the cycle, subsequent calculation is not performed, and this measurement ends.

Figure 7:
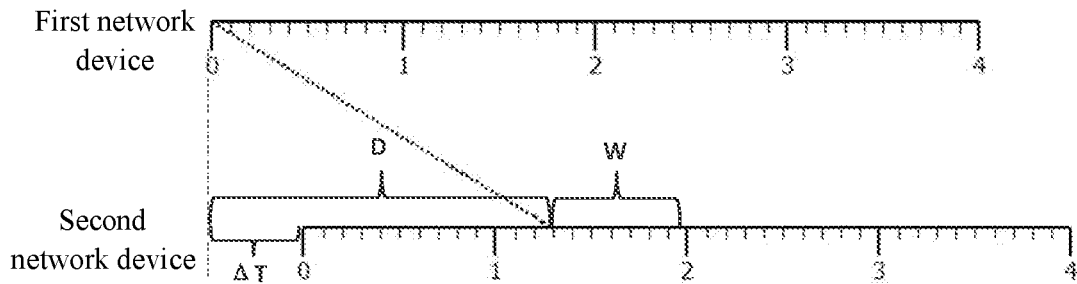
FIG. 7 is a schematic diagram of cycle offset calculation according to the embodiments of the present disclosure.

FIG. 7 is a schematic diagram of cycle offset calculation according to the embodiments of the present disclosure. As shown in FIG. 7, in operation S604 of this embodiment, a cycle offset ΔT between two devices corresponding to the cycle may be obtained by using the following formula 1:

$$\Delta T = \text{MOD}((D + W), T) \qquad \text{(formula 1)}$$

In the above formula, T represents the cycle length; W represents the time from the moment of receiving the cycle offset measurement message recorded in S603 to the starting moment of the next new corresponding cycle; D represents the link latency between the first network device and the second network device, wherein the value of the link latency can be measured in the conventional art, and therefore the acquisition method of the link latency is not described in detail in the embodiments of the present disclosure; MOD is a modulus function which returns a remainder after division between two numbers; and ΔT denotes the time by which the starting moment of each cycle of the second network device in a single measurement is delayed compared to the starting moment of each cycle of the first network device in the single measurement.

In operation S605 of this embodiment, the finally obtained cycle offset value between the two devices is an average value of multiple measurement results, and the number of measurement times is determined by the number of cycle offset measurement messages set in operation S601.

In this embodiment, also provided is a method for advertising a cycle offset. After a cycle offset between two adjacent nodes is measured, the network device may advertise the cycle offset to other nodes or controllers of the entire network, so that components such as a path calculation unit/controller can acquire the information, and accurately perform path planning, traffic scheduling, etc. according to the information and other required information.

Specifically, the advertised cycle offset information at least includes an address or interface capable of identifying the local network device, an address or interface capable of identifying the peer network device, a cycle length, and a cycle offset value of the local device relative to the peer device with respect to the cycle. If the network device supports multi-cycle scheduling, the network device respectively advertises the cycle offset information for different cycles. For a distributed control model, the foregoing cycle offset information may be advertised in the intra-domain and inter-domain by extending an IGP (for example, an Open Shortest Path First (OSPF) protocol, an Intermediate System to Intermediate System (ISIS) protocol) and BGP-LS attributes. For the centralized control model, the cycle offset information of each node may be acquired/reported through a southbound interface (such as NETCONF and BGP-LS) between the controller and the network device.

Figure 8:
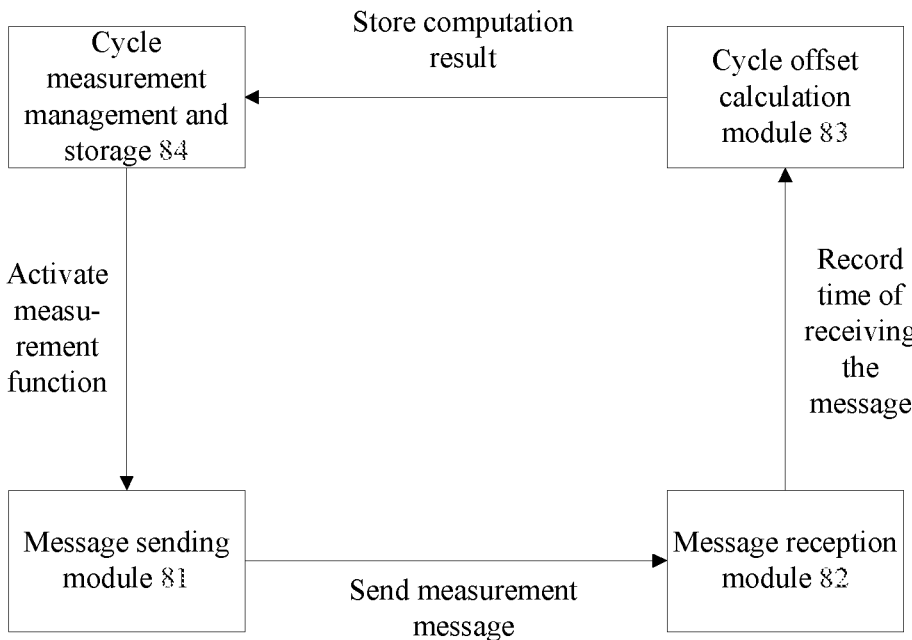
FIG. 8 is a schematic diagram of a cooperative relationship among modules in an apparatus for measuring a cycle offset between network devices according to the embodiments of the present disclosure.

The embodiments of the present disclosure further provide an apparatus for measuring a cycle offset between network devices, including the following modules; a message sending module 81, a message reception module 82, a cycle offset calculation module 83, and a cycle measurement management and storage module 84. FIG. 8 is a schematic diagram of a cooperative relationship among modules. The functions of the modules are described as follows.

The message sending module 81 is configured to send a cycle offset measurement message to an adjacent device, wherein the content of the cycle offset measurement message at least contains a field representing a cycle length. The message sending module 81 is functionally equivalent to the sending module 31 in the foregoing embodiments.

The message reception module 82 is configured to receive the cycle offset measurement message sent by the adjacent device, record a moment when the cycle offset measurement message is received, acquire a cycle length carried in the cycle offset measurement message, and obtain the remaining time of the cycle in the current round. The message reception module 82 is functionally equivalent to the reception module 21 in the foregoing embodiments.

The cycle offset calculation module 83 is configured to calculate according to a calculation formula to obtain a cycle offset value of this measurement. The cycle offset calculation module 83 is functionally equivalent to the determination module 22 in the embodiments described above.

The cycle measurement management and storage module 84 is configured to activate a global measurement function or a measurement function for a specified cycle, and set the number of cycle offset measurement messages, etc.; average a plurality of measurement results, and store a final cycle offset value between two devices. The cycle measurement management and storage module 84 functionally includes the functions of the activation module 32 and the setting module 33 in the above embodiments, and part of the functions of the storage module 23.

The embodiments of the present disclosure further provide a method for measuring a cycle offset between different devices. FIG. 9 is a flowchart of a method for measuring a cycle offset between different devices according to the embodiments of the present disclosure. In this embodiment, it is assumed that there are two network devices A and B, and frequency synchronization has been performed between the two devices, but time synchronization has not yet performed, so there is a certain phase difference. FIG. 10 is a schematic diagram of measurement of a cycle offset between different network devices A and B according to the embodiments of the present disclosure. As shown in FIG. 10, assuming that the link latency between network devices A and B is 35 us and the length of a cycle scheduling window operated on the two devices is 10 us, the method for measuring the cycle offset between the network devices A and B includes the following operations S901 to S905.

In operation S901, a cycle offset measurement function of the network device A is activated.

Specifically, the cycle offset measurement function may be activated globally or activated according to a cycle of 10 us, and the number of measurement messages is set to 5.

In operation S902, the network device A sends a cycle offset measurement message to the network device B at the starting moment of each cycle, wherein the cycle offset measurement message carries a cycle length field.

Specifically, the network device A sends a cycle offset measurement message to the network device B at a starting moment of each 10 us cycle, wherein the cycle offset measurement message carries a 10 us cycle length field indicating that the cycle offset for a cycle length of 10 us is measured; and there are 5 cycle offset measurement messages sent in total.

In operation S903, the network device B receives the cycle offset measurement message sent by the network device A, records the time when the cycle offset measurement message is received, parses the field of the specified cycle length carried in the cycle offset measurement message, and can learn that the local cycle of 10 us still has 7 us remaining time to end this round of scheduling.

In operation S904, the cycle offset of a single measurement is calculated.

Specifically, according to formula 1, with regard to the cycle length 10 us, the cycle offset of the network device B relative to the network device A is $\Delta T = MOD((35+7), 10)$, and therefore the cycle offset of a single measurement is calculated to be 2 us.

In operation S905, multiple measurement cycle offsets are averaged.

Specifically, the results of the 5 measurements are averaged, assuming that the average value is 2 us, then the network device B locally records the offset value of the cycle of 10 us between the network device B and the network device A is 2 us.

In this embodiment, if the network device A and the network device B support multi-cycle scheduling, the method for measuring the offset of each cycle is the same as the above operations. Table 1 is an example of cycle offset data between the network device B and the network device A stored by the network device B.

TABLE 1

| LOCAL DEVICE INFORMATION | | PEER DEVICE INFORMATION | | | |
|---|---|---|---|---|---|
| NODE ID | INTERFACE | NODE ID | INTERFACE | CYCLE | CYCLE OFFSET |
| nodeB | Interface1 | nodeA | Interface2 | 10 us | 2 us |
| | | | | 20 us | N/A |
| | | | | 40 us | 2 us |
| . . . | . . . | . . . | . . . | . . . | . . . |

In the foregoing table, for the cycle 20 us at the network device B, the cycle offset of the cycle is N/A, indicating that the network device B does not receive any cycle offset measurement message of the cycle of 20 us sent by the network device A, and the reason may be that the network device A does not activate a measurement function for the cycle, or the network device A does not support cycle scheduling of 20 us.

The embodiments of the present disclosure further provide an example of encapsulation of the cycle offset measurement message. For example, a sub-TLV, called a cycle measurement sub-TLV, may be newly added into a performance measurement message of an OAM, and may be used for carrying information required by cycle offset measurement. FIG. 11 is a schematic diagram of an encapsulation structure of a cycle offset measurement message according to the embodiments of the present disclosure, wherein the type field is used for indicating that the sub-TLV is a cycle offset measurement type, a specific numerical value is to be determined, and the length field represents the length of the sub-TLV, the cycle field is used to specify the cycle that needs to be measured, and the unit is microsecond (us), for example, 10 indicates that an offset of a cycle of 10 us is to be measured.

The embodiments of the present disclosure further provide an example of encapsulation of a cycle offset information advertisement message, for example, an OSPF may be extended, a new link attribute sub-TLV, called cycle-offset sub-TLV, is added for carrying the cycle offset between two devices associated by the link. FIG. 12 is a schematic diagram of an encapsulation structure of a cycle offset information advertisement message according to the embodiments of the present disclosure. The type field uses a specific numerical value to indicate that the sub-TLV is of the cycle offset attribute type, and the length field indicates the length of the sub-TLV, the cycle field is used to specify a cycle length in microsecond (us), for example, 10 indicates that the cycle is 10 us, and the cycle-offset field indicates the offset value of the local node relative to the peer node for the current cycle, and the unit is microsecond (us), for example, 3 indicates that the 10 us cycle of the local node is 3 us later than the 10 us cycle of the peer node.

The specific carrying position of the extended cycle-offset sub-TLV is not particularly limited, and may be a link attribute sub-TLV or a node attribute sub-TLV, as long as the node attribute sub-TLV includes information capable of identifying the information of the local node and the peer node, and a cycle and a cycle offset corresponding to the cycle.

In this embodiment, only an example of extending OSPF is provided, and extensions of other protocols (such as IS-IS and BGP-LS) are similar, which are not described herein again.

The embodiments of the present disclosure further provide a computer-readable storage medium. The computer-readable storage medium stores a computer program, wherein the computer program, when running on a processor, causes the processor to execute the operations in any one of the method embodiments.

In an exemplary embodiment, the computer-readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

The embodiments of the present disclosure also provide an electronic device, including a memory and a processor, wherein the memory stores a computer program, and the processor is configured to run the computer program so as to execute the operations in any of the described method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the described embodiments of the present disclosure can be implemented by a universal computing apparatus, they may be centralized on a single computing apparatus or distributed on a network composed of a plurality of computing apparatuses, they can be implemented by program codes executable by a computing apparatus, and thus can be stored in a storage apparatus and executed by the computing apparatus. Furthermore, in some cases, the shown or described operations may be executed in an order different from that described here, or they are made into integrated circuit modules respectively, or a plurality of modules or operations therein are made into a single integrated circuit module for implementation. In this way, the embodiments of the present disclosure are not limited to any specific combination of hardware and software.

The foregoing descriptions are merely exemplary embodiments of the present disclosure, but are not intended to limit the embodiments of the present disclosure. For those having ordinary skill in the art, the embodiments of the present disclosure may have various modifications and variations. Any modifications, equivalent replacements, improvements and the like made within the principle of the embodiments of the present disclosure shall belong to the scope of protection of the embodiments of the present disclosure.

What is claimed is:

1. An information measurement method, comprising:
receiving, by a second network device, a cycle offset measurement message sent by a first network device adjacent to the second network device at a starting moment of a scheduling cycle, wherein the cycle offset measurement message comprises a field representing a cycle length of the scheduling cycle; and
determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device.

2. The information measurement method according to claim 1, wherein before sending, by the first network device, the cycle offset measurement message at the starting moment of the scheduling cycle, the information measurement method further comprises:
activating a cycle offset measurement function of the first network device for a designated scheduling cycle or a plurality of scheduling cycles, and setting the number of cycle offset measurement messages.

3. The information measurement method according to claim 2, wherein the activating a cycle offset measurement function of the first network device for a plurality of scheduling cycles comprises:
in a case where the first network device has a capability of scheduling in multiple scheduling cycles, activating the cycle offset measurement function for each of the multiple scheduling cycles.

4. The information measurement method according to claim 1, wherein the determining, by the second network device, a cycle offset of the scheduling cycle between the first network device and the second network device according to a receiving moment at which the second network device receives the cycle offset measurement message, the cycle length of the scheduling cycle, and a link latency between the first network device and the second network device comprises:

recording, by the second network device, the receiving moment at which the second network device receives the cycle offset measurement message, and determining, by the second network device, remaining time of the scheduling cycle in a current cycle of the second network device according to a difference between the receiving moment and the cycle length of the scheduling cycle; and performing a modulus operation with a sum of the link latency and the remaining time in the current cycle as a dividend and the cycle length of the scheduling cycle as a divisor, so as to obtain the cycle offset of the scheduling cycle between the first network device and the second network device.

5. The information measurement method according to claim 4, wherein in a case where there are a plurality of cycle offset measurement messages, the determining, by the second network device, a cycle offset of the scheduling cycle between the first network device and the second network device comprises:

acquiring a plurality of cycle offsets corresponding to respective cycle offset measurement messages of the plurality of cycle offset measurement messages; and determining an average value of the plurality of cycle offsets as the cycle offset of the scheduling cycle between the first network device and the second network device.

6. The information measurement method according to claim 1, wherein after the determining, by the second network device, a cycle offset of the scheduling cycle between the first network device and the second network device, the information measurement method further comprises:

storing the cycle offset into a cycle offset information advertisement message, and advertising the cycle offset information advertisement message to other nodes or controllers in an entire network; and in a case of supporting scheduling in multiple scheduling cycles, respectively advertising the cycle offset information advertisement message corresponding to each of the multiple scheduling cycles to the other nodes or controllers in the entire network.

7. The information measurement method according to claim 6, wherein the cycle offset information advertisement message comprises an address or interface of the first network device, an address or interface of the second network device, the cycle length of the scheduling cycle, and the cycle offset.

8. The information measurement method according to claim 6, wherein the advertising the cycle offset information advertisement message to other nodes or controllers in an entire network or the advertising the cycle offset information advertisement message corresponding to each of the multiple scheduling cycles to the other nodes or controllers in the entire network comprises:

for a distributed control model, performing intra-domain or inter-domain advertisement of the cycle offset information advertisement message by expanding an attribute of an Interior Gateway Protocol (IGP) or a Border Gateway Protocol-Link State (BGP-LS); for a centralized control model, acquiring or reporting the cycle offset information advertisement message via a southbound interface between the controllers and network devices.

9. The information measurement method according to claim 1, wherein the cycle offset measurement message is a sub-Type Length Value (TLV) newly added in a performance measurement message of Operation Administration and Maintenance (OAM), and an encapsulation format of the cycle offset measurement message comprises: a field for indicating that the sub-TLV is of a cycle offset measurement type; a field indicating a length of the sub-TLV; and a field indicating the cycle length of the scheduling cycle.

10. The information measurement method according to claim 6, wherein the cycle offset information advertisement message is a sub-Type Length Value (TLV) which is of a link attribute type and is newly added through protocol extension, and an encapsulation format of the cycle offset information advertisement message comprises: a field for indicating that the sub-TLV is of a cycle offset attribute type; a field indicating a length of the sub-TLV; a field indicating the cycle length of the scheduling cycle; and a field indicating the cycle offset.

11. An information measurement apparatus, provided in a second network device, and comprising a memory, a processor and a computer program stored on the memory and capable of running on the processor, wherein the processor executes the computer program to implement the following operations:

receiving a cycle offset measurement message sent by a first network device adjacent to the second network device at a starting moment of a scheduling cycle, wherein the cycle offset measurement message comprises a field representing a cycle length of the scheduling cycle; and determining a cycle offset of the scheduling cycle between the first network device and the second network device according to a receiving moment at which the second network device receives the cycle offset measurement message, the cycle length of the scheduling cycle, and a link latency between the first network device and the second network device.

12. The information measurement apparatus according to claim 11, wherein the processor executes the computer program to further implement the following operations:

storing the cycle offset into a cycle offset information advertisement message, and advertising the cycle offset information advertisement message to other nodes or controllers in an entire network; and in a case of supporting scheduling in multiple scheduling cycles, respectively advertising the cycle offset information advertisement message corresponding to each of the multiple scheduling cycles to the other nodes or controllers in the entire network.

13. An information measurement apparatus, provided in a first network device, and comprising a memory, a processor and a computer program stored on the memory and capable of running on the processor, wherein the processor executes the computer program to implement the following operations:

sending a cycle offset measurement message to a second network device adjacent to the first network device at a starting moment of a scheduling cycle, wherein the cycle offset measurement message comprises a field representing a cycle length of the scheduling cycle, so that the second network device determines a cycle offset of the scheduling cycle between the first network device and the second network device according to a receiving moment at which the second network device receives the cycle offset measurement message, the cycle length of the scheduling cycle, and a link latency between the first network device and the second network device.

14. The information measurement apparatus according to claim 13, wherein the processor executes the computer program to further implement the following operations:

activating a cycle offset measurement function for a designated scheduling cycle or a plurality of scheduling cycles; and setting the number of cycle offset measurement messages.

15. A non-transitory computer-readable storage medium, wherein the computer-readable storage medium stores a computer program, and the computer program, when being executed by a processor, causes the processor to execute operations of the information measurement method according to claim 1.

16. The information measurement apparatus according to claim 11, wherein the determining a cycle offset of the scheduling cycle between the first network device and the second network device according to a receiving moment at which the second network device receives the cycle offset measurement message, the cycle length of the scheduling cycle, and a link latency between the first network device and the second network device comprises:

recording the receiving moment at which the second network device receives the cycle offset measurement message, and determining remaining time of the scheduling cycle in a current cycle of the second network device according to a difference between the receiving moment and the cycle length of the scheduling cycle; and performing a modulus operation with a sum of the link latency and the remaining time in the current cycle as a dividend and the cycle length of the scheduling cycle as a divisor, so as to obtain the cycle offset of the scheduling cycle between the first network device and the second network device.

17. The information measurement apparatus according to claim 16, wherein in a case where there are a plurality of cycle offset measurement messages, the determining a cycle offset of the scheduling cycle between the first network device and the second network device comprises:

acquiring a plurality of cycle offsets corresponding to respective cycle offset measurement messages of the plurality of cycle offset measurement messages; and determining an average value of the plurality of cycle offsets as the cycle offset of the scheduling cycle between the first network device and the second network device.

18. The information measurement apparatus according to claim 12, wherein the cycle offset information advertisement message comprises an address or interface of the first network device, an address or interface of the second network device, the cycle length of the scheduling cycle, and the cycle offset.

19. The information measurement apparatus according to claim 12, wherein the advertising the cycle offset information advertisement message to other nodes or controllers in an entire network or the advertising the cycle offset information advertisement message corresponding to each of the multiple scheduling cycles to the other nodes or controllers in the entire network comprises:

for a distributed control model, performing intra-domain or inter-domain advertisement of the cycle offset information advertisement message by expanding an attribute of an Interior Gateway Protocol (IGP) or a Border Gateway Protocol-Link State (BGP-LS); for a centralized control model, acquiring or reporting the cycle offset information advertisement message via a southbound interface between the controllers and network devices.

20. The information measurement apparatus according to claim 14, wherein the activating a cycle offset measurement function of the first network device for a plurality of scheduling cycles comprises:

in a case where the first network device has a capability of scheduling in multiple scheduling cycles, activating the cycle offset measurement function for each of the multiple scheduling cycles.

* * * * *